United States Patent
Boianjiu

[19]

[11] Patent Number: 5,702,210
[45] Date of Patent: Dec. 30, 1997

[54] CUTTING TOOL WITH REPLACEABLE CUTTING INSERT

[75] Inventor: Gideon Boianjiu, Kfar Havradim, Israel

[73] Assignee: Iscar Ltd., Tefen, Israel

[21] Appl. No.: 734,368

[22] Filed: Oct. 16, 1996

Related U.S. Application Data

[63] Continuation of Ser. No. 341,616, filed as PCT/EP93/09713, Dec. 29, 1993 published as WO94/15741, Jul 21, 1994, abandoned.

[30] Foreign Application Priority Data

Dec. 30, 1992 [IL] Israel ............................ 104273

[51] Int. Cl.⁶ .................................................. B23B 27/16
[52] U.S. Cl. ...................................... 407/100; 407/114
[58] Field of Search ........................... 407/41, 49, 100, 407/104, 108, 114, 116, 107, 102, 103, 109, 110, 113, 115

[56] References Cited

U.S. PATENT DOCUMENTS

| | | |
|---|---|---|
| 4,189,264 | 2/1980 | Kraemer. |
| 4,934,879 | 6/1990 | van Barneveld .................... 407/116 |
| 5,011,340 | 4/1991 | Pettersson et al. ................ 407/114 |

FOREIGN PATENT DOCUMENTS 20 23 648  11/1970  Germany.

OTHER PUBLICATIONS

Database WPI, Section PQ, Week 8630, 8 Aug. 1986, Derwent Pubications Ltd., London, GB; Class P54, AN 86–195791 & SU,A,1 199 468 (Chernavskit) 23 Dec. 1985, see abstract.

Primary Examiner—Daniel W. Howell
Assistant Examiner—Mark Williams
Attorney, Agent, or Firm—Pennie & Edmonds LLP

[57] ABSTRACT

A metal cutting tool comprising a tool holder and a double sided cutting insert is disclosed. The insert has rake surfaces formed in the corners of upper and lower surfaces of the insert with a recess formed in the corners. The insert is retained by the tool holder via a shim, substantially corresponding in shape and lateral dimensions to the insert. The shim has a projection which mates with the recess. When the insert and shim are clamped in the tool holder, the projection adjacent an operative pair of insert cutting edges bears against the walls of the associated recess, effectively supporting the insert in this region. This results in the inoperative lower cutting edges being spaced from the shim.

13 Claims, 9 Drawing Sheets

CUTTING TOOL WITH REPLACEABLE CUTTING INSERT

This is a continuation of application Ser. No. 08/341,616, filed as PCT/EP93/03713, Dec. 29, 1993 published as WO94/15741, Jul. 21, 1997, now abandoned.

FIELD OF THE INVENTION

This invention relates to metal cutting tools and, in particular, metal cutting tools having replaceable cutting inserts for use, for example, in milling, drilling, boring or turning operations.

BACKGROUND OF THE INVENTION

The cutting inserts for use with such metal cutting tools have generally been formed as single sided or double sided inserts, the latter, of course, being preferred seeing that it allows for doubling the number of cutting edges which are available for use. Such replaceable cutting inserts are clampingly retained in an insert retaining pocket formed in a tool holder with the insert itself resting either directly on a base wall of the pocket, or via a correspondingly shaped and sized shim. Such known cutting inserts are formed with rake surfaces which are generally provided with chip forming grooves. Where double sided cutting inserts are involved, the mounting of the insert must be such as to ensure that the lower cutting edge (i.e. the cutting edge not being at that stage operative) is protected against damage and, for this purpose, it is generally ensured that the construction of the lower surface of the insert and/or the adjacent bearing surface of the pocket wall or shim is such that a certain degree of spacing is maintained between the lowermost cutting edge and the adjacent bearing surface. However, the provision of the chip forming groove in the respective rake surfaces of the insert carries with it the consequence that the lower surface of the insert, which is provided with such a chip forming groove, bears on the corresponding surface of the shim or base wall of the pocket only in those central portions of the lower surface inwardly of the chip forming groove which are spaced significantly from the cutting edges.

It will therefore be realized that, with the exertion of machining forces on the insert and in view of the fact that the lower surface of the insert is only supported at its inner base portions, a bending moment is exerted on the insert which, especially in heavy duty conditions, could result in a fracture of the insert. It will be realized that the wider the chip forming groove, the greater is the bearing surface of the insert displaced inwardly from the cutting edge and the greater is the bending moment exerted on the insert. Such widening of the chip forming groove is generally necessary in heavy duty conditions in order to form chips of relatively large cross-sectional shape and this, of itself, results in increasing machining forces and a corresponding increase in the deleterious bending moment which is exerted on the insert.

It is for this reason that the use of double sided inserts has been considerably restricted, especially in the case of double sided inserts having a negative cutting geometry.

It has been proposed in DE 2023648 to provide a machine cutting tool having a double faced insert and provided in its upper and lower surfaces with recesses in which a mechanical chip former is fitted. The tool is provided with a shim which is formed with an upper bearing surface shaped to correspond with that of the recess formed on the lower surface of the insert. This proposal, however, carries with it the requirement that the shape of the shim's bearing surface must match with the shape of the adjacent recess, or otherwise it cannot be ensured that the cutting insert will always be seated accurately on the shim. Furthermore, with use the uppermost insert surface is subjected to wear and, when the insert is reversed so that this surface bears on the bearing surface of the shim, an accurate placing of the insert within the pocket is no longer possible.

It is therefore an object of the present invention to provide a new and improved metal cutting tool having a double sided cutting insert in which means are provided for substantially reducing, or avoiding, the above-referred-to disadvantages.

BRIEF SUMMARY OF THE INVENTION

According to the present invention, there is provided a metal cutting tool comprising a tool holder; a cutting insert retaining pocket formed in said tool holder and defined by a pocket base wall and a pocket side wall; a cutting insert of substantially prismatic shape having upper and lower surfaces and side relief surfaces; said upper and lower surfaces being each formed with a rake surface and a bearing surface; cutting edges defined between each side surface and an adjacent rake surface; chip forming means formed in said rake surfaces adjacent said cutting edges; pairs of adjacent side surfaces and their associated rake surfaces defining between them insert corners; said insert being indexable so as to present successive pairs of operative cutting edges having common insert corners; a shim substantially corresponding in shape and lateral dimensions to said insert located on said pocket base wall and supporting said insert; and clamping means for clampingly retaining said insert and shim within said pocket with said insert being firmly clamped at a first side portion thereof remote from a pair of operative cutting edges against said pocket side wall and, at its lower surface, adjacent said operative cutting edges against said shim; characterized in that there is formed in the rake surfaces of each of said upper and lower surfaces respectively in the region of each of said corners a recess and that said shim is formed in an upper surface thereof adjacent at least one corner thereof a projection adapted to fit into a corresponding recess of the adjacent insert surface so that when the insert and shim are clamped in said pocket the projection adjacent the operative pair of cutting edges bears against the walls of the associated recess so as effectively to support the insert in this region with said operative cutting edges spaced from said shim.

With such a metal cutting tool, the fact that the lower surface of the insert is always supported in the region adjacent the operative pair of cutting edges, as well as being supported by its inner bearing surface, ensures that any bending moment exerted on the insert by the machining forces, is minimal and in this way the dangers of fracture of the insert are significantly reduced.

BRIEF DESCRIPTION OF THE DRAWINGS

For a better understanding of the present invention and to show how the same may be carried out in practice, reference will now be made to the accompanying drawings, in which.

3

DETAILED DESCRIPTION OF PREFERRED EMBODIMENT

Figure 1:
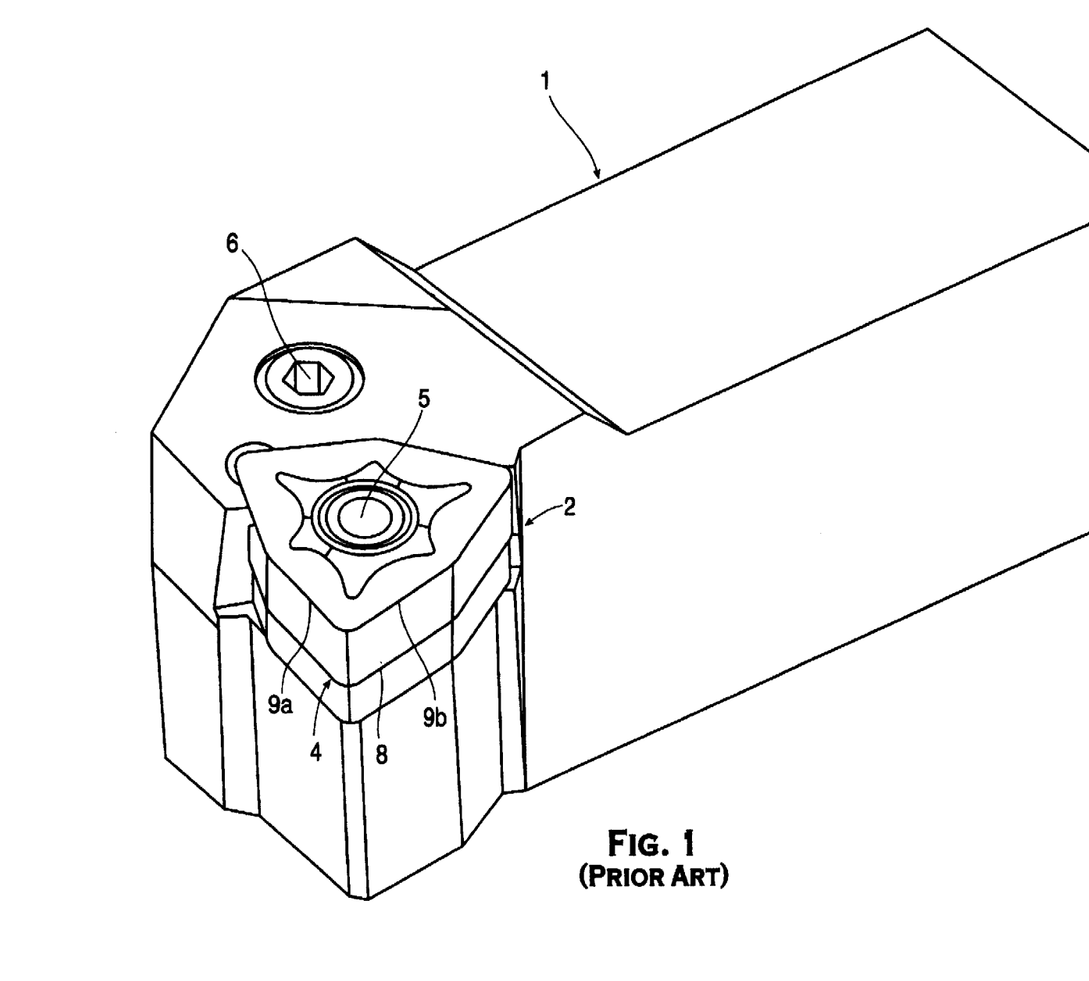
FIG. 1 is a perspective view of a metal cutting tool of the kind to which the present invention relates.
Figure 2:
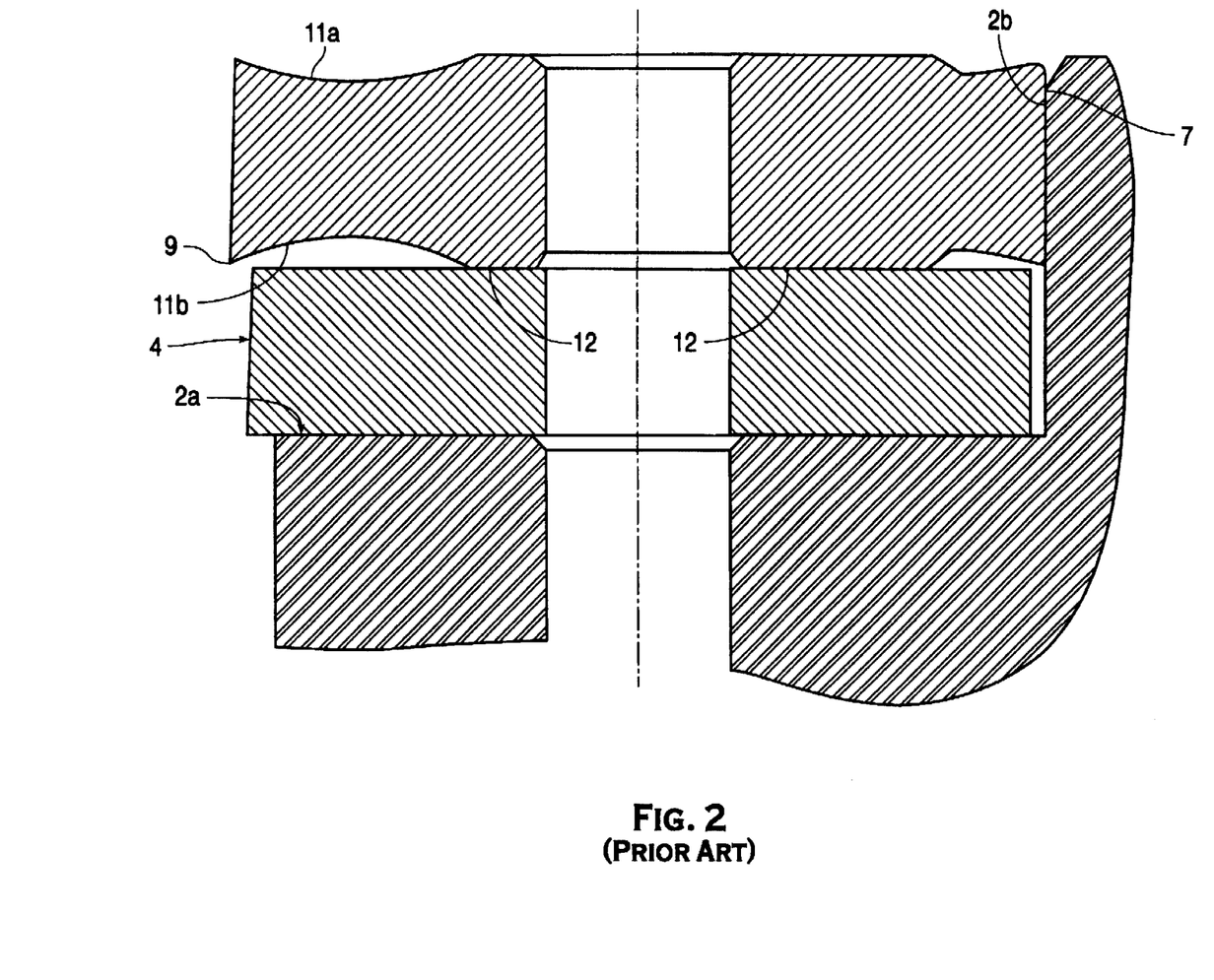
FIG. 2 is a cross-sectional view of a portion of a cutting tool of the kind shown in FIG. 1, but having a known double sided metal cutting insert.
Figure 3:
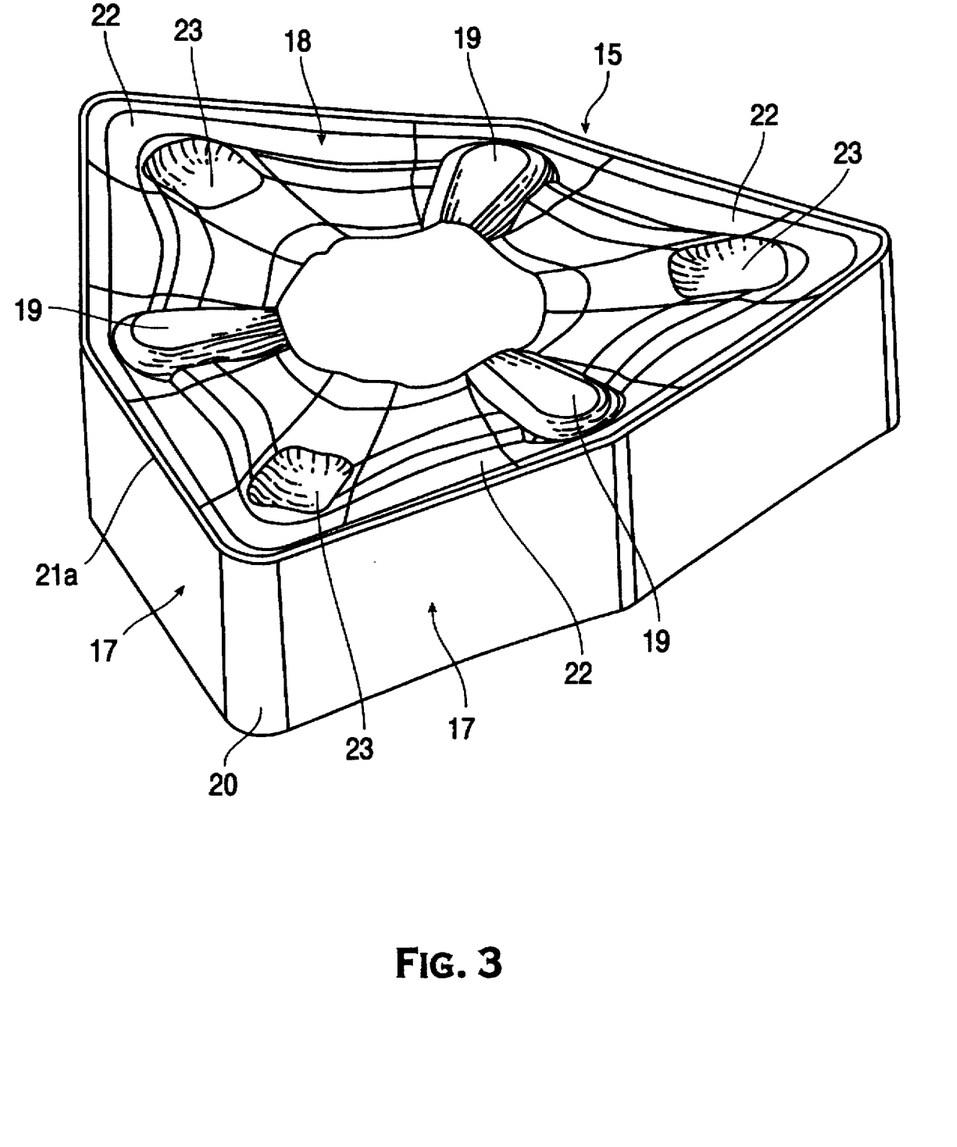
FIG. 3 is a perspective view of a double sided metal cutting insert for use with a cutting tool in accordance with the present invention.
Figure 4:
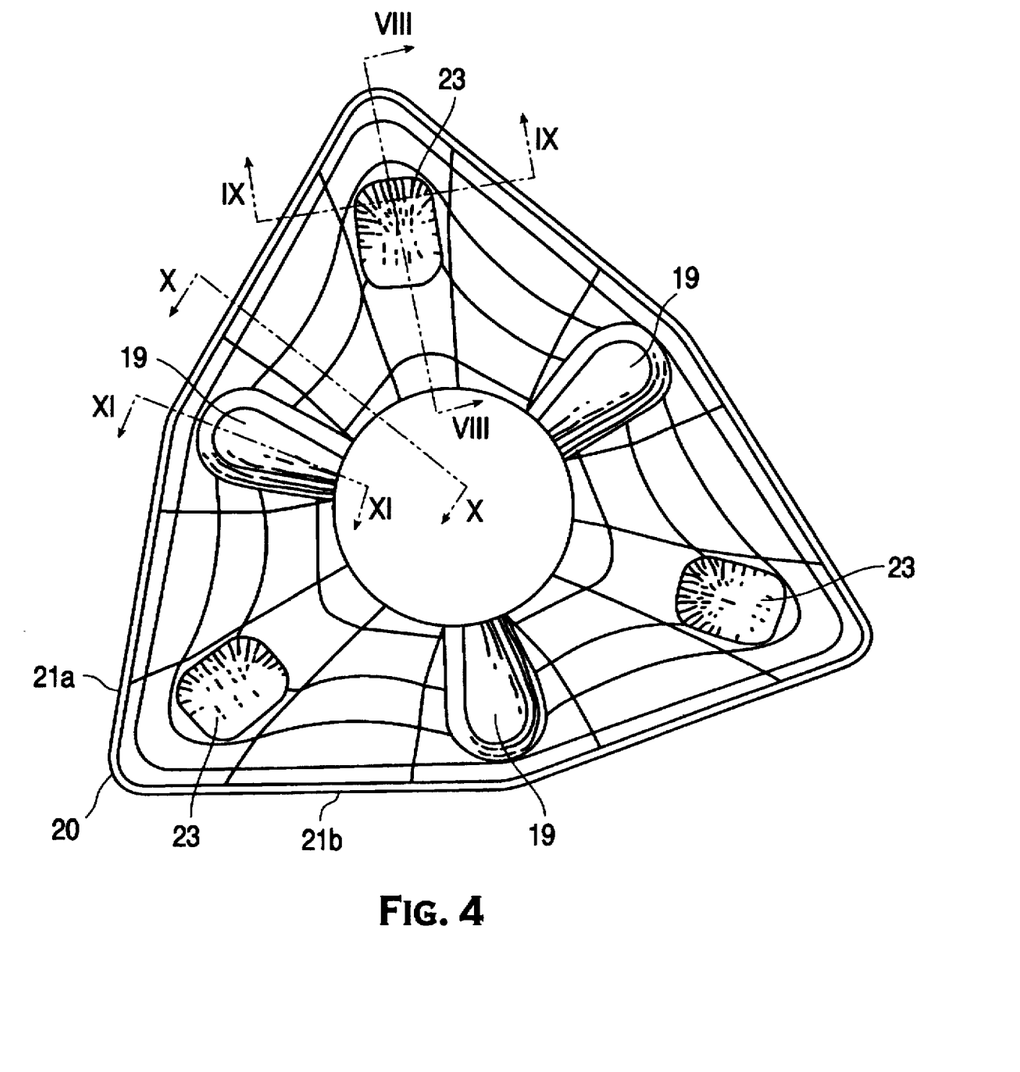
FIG. 4 is a plan view from above of the metal cutting insert shown in FIG. 3.
Figure 7:
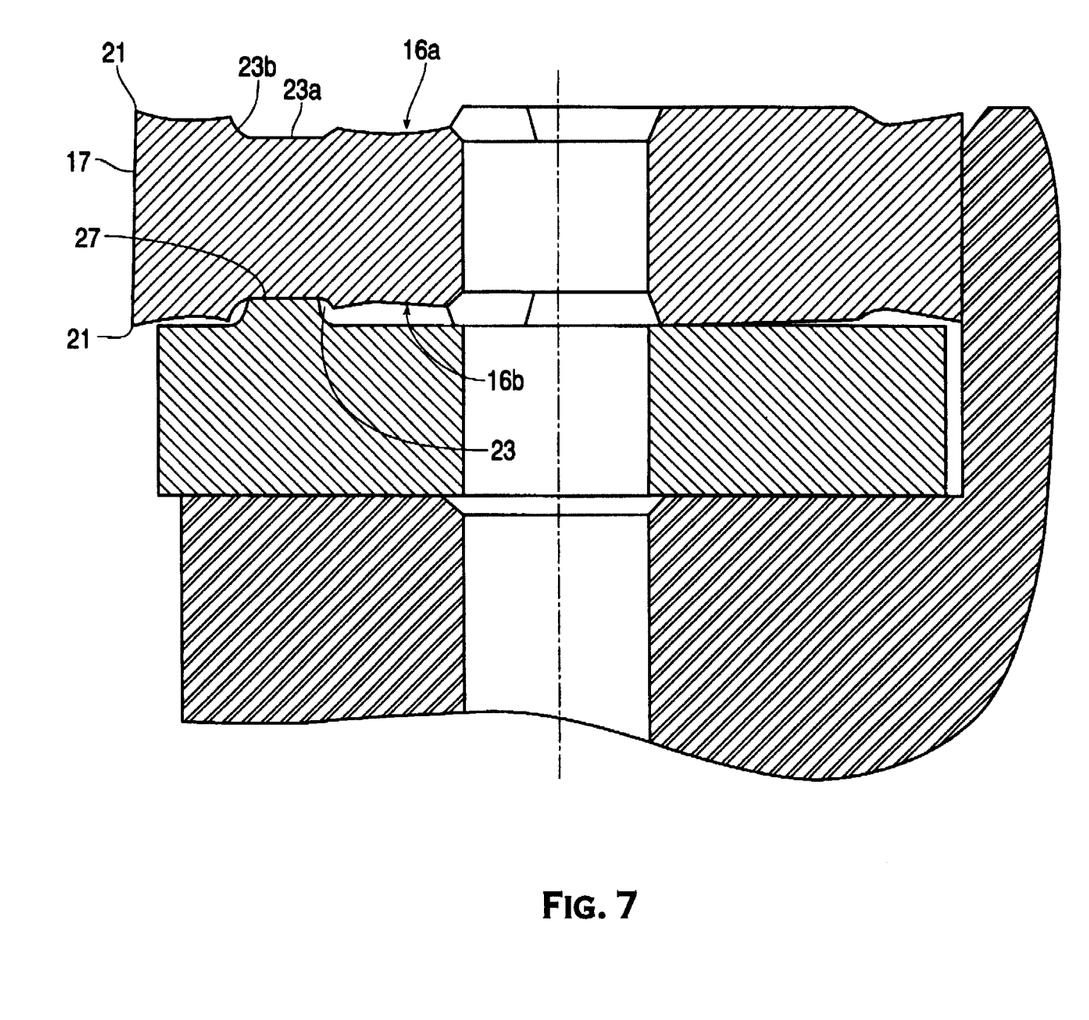
FIG. 7 is a cross-sectional view of the insert and shim shown in FIG. 6, when mounted on the tool holder.

As seen in FIGS. 1, 2 and 7 of the drawings, the metal cutting tool of the kind to which the present invention is applied comprises a tool holder 1 formed with an insert retaining pocket 2 defined by a pocket base wall 2a and a pocket side wall 2b with the side wall 2b being slightly inclined towards the base wall 2a. A metal cutting insert 3 is located within the pocket 2, resting on a correspondingly dimensioned and shaped shim 4. The insert 3 and shim 4 are retained within the pocket 2 by a retaining lever 5 of known construction and by clamping means 6 (also of known construction), so that a side wall 7 of the cutting insert 3 is effectively clamped against the side wall 2b of the pocket, and so that the insert 3 is clamped at a lower surface 8 thereof adjacent a pair of operative cutting edges 9a and 9b clamped against the adjacent surface of the shim 4.

Referring to FIG. 2 of the drawings, it will be seen that with a known double sided insert having opposite rake surfaces thereof formed with chip forming grooves 11a and 11b, formed respectively on the upper and lower surfaces of the insert, and with the lowermost cutting edges 9 spaced from the adjacent surface of the shim 4 (so as to protect these cutting edges), the insert essentially bears on the shim 4 via bearing surfaces 12 which are significantly displaced inwardly with respect to the cutting edge 9. In consequence, machining forces acting on the insert give rise to a bending moment which can result in the fracture of the insert. It is for this reason, and has been explained above, that the use of such double sided inserts has not been successful.

Reference will now be made to the remaining FIGS. 3 through 11 of the drawings, which illustrate how the specially-designed insert and shim in accordance with the present invention allow for the effective use of double sided cutting inserts. As seen in the drawings, and in particular in FIGS. 3 through 7 thereof, a cutting insert 15 is formed with upper and lower surfaces 16a and 16b (see FIG. 7) and side relief surfaces 17. Each of the upper and lower surfaces 16a and 16b is formed with a rake surface 18 and radially directed bearing surfaces or regions 19. Adjacent pairs of relief flanks 17 define between them an insert corner 20. Defined between each pair of adjacent relief flanks 17 and the corresponding rake surfaces 18 is a pair of operative cutting edges 21a and 21b. Formed in the rake surfaces 18 and extending around these rake surfaces adjacent to the cutting edges 21 is a chip former groove 22.

Formed in each of the rake surfaces 18, respectively adjacent the three corners 20 thereof, are recesses 23 located adjacent each pair of operative cutting edges 21a and 21b. Each recess 23 is, as seen in FIG. 7 of the drawings, formed with a base wall 23a and side tapering walls 23b. The recess 23 is in fact of truncated, trapezoidal shape. Each recess is

Figure 10:
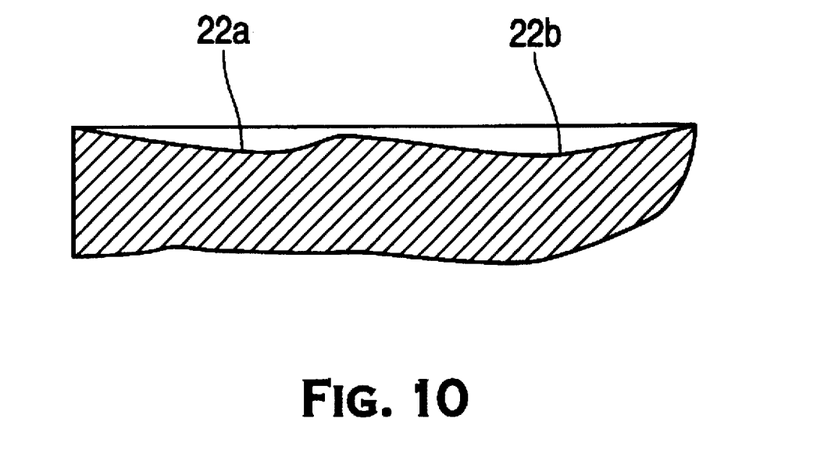
Figure 11:
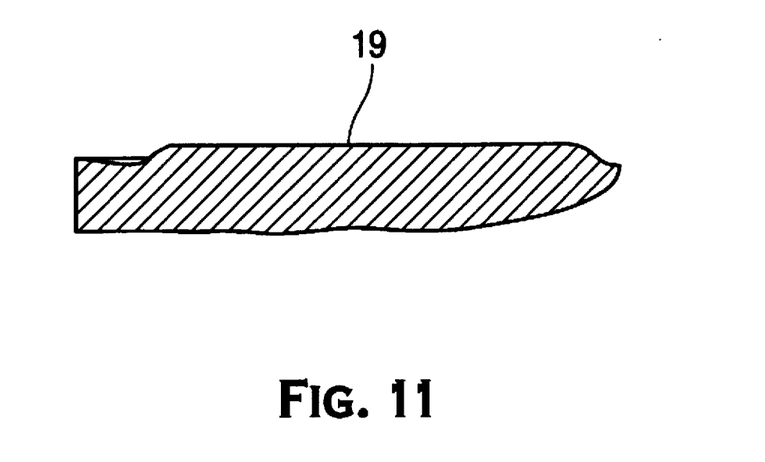

4 located immediately adjacent to and inwardly of a deflector wall 22' of the chip former groove 22. As can be seen in FIG. 10 of the drawings, the regions of the chip former groove 22 intermediate each recess and a radically directed bearing surface comprises a first, outer chip former groove 22a and a successive, inner chip former groove 22b. Furthermore, as seen in FIG. 11 of the drawings, the bearing surfaces 19 are constituted by upper substantially planar plateaux.

Figure 5:
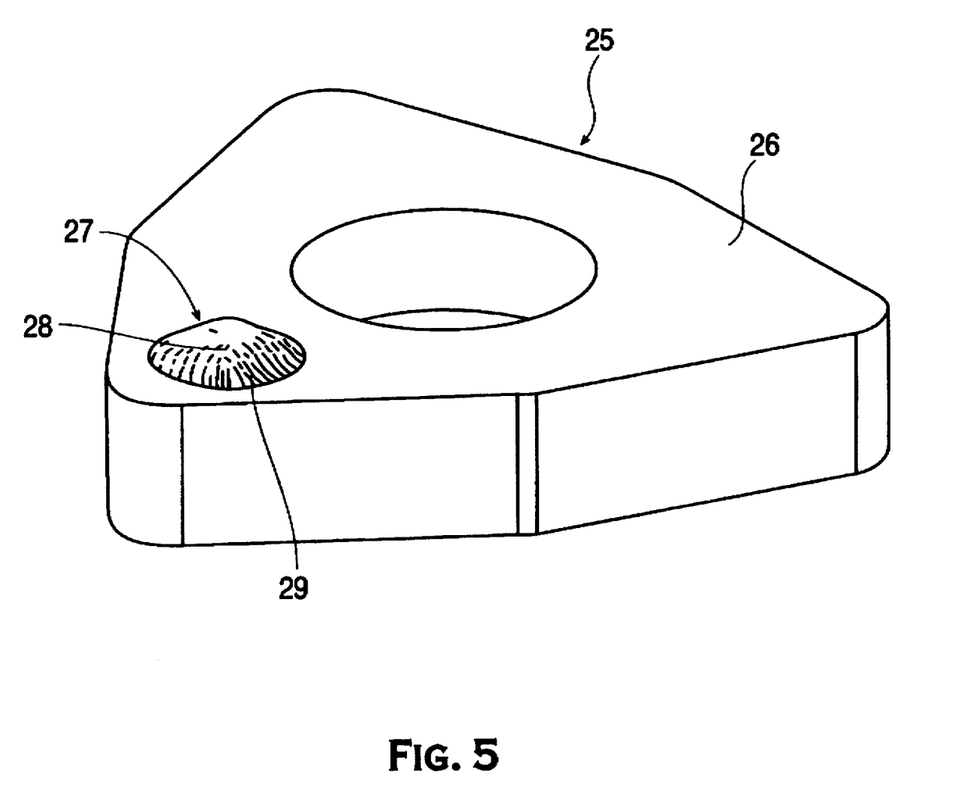
FIG. 5 is a perspective view of an insert support shim for use in a metal cutting tool in accordance with the present invention.

Referring now to FIG. 5 of the drawings, there is here shown a shim 25 which has a similar shape to that of the insert 15 but is of slightly lesser lateral dimensions. Formed in an upper surface 26 of the shim and adjacent a corner thereof is a projection 27 which is also essentially of truncated, trapezoidal shape having an upper surface 28 and tapering side surfaces 29.

Figure 6:
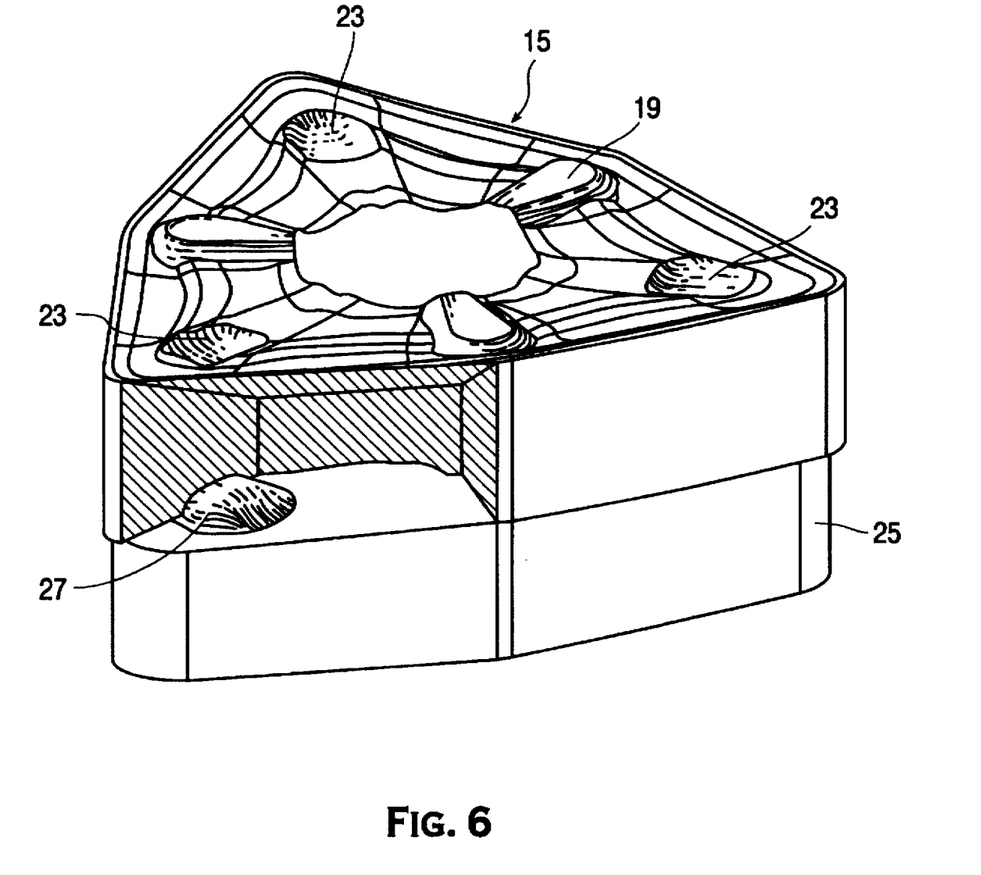
FIG. 6 is a partially-sectioned perspective view of the cutting insert shown in FIGS. 3 and 4 when resting on the shim shown in FIG. 5.

As seen in FIGS. 6 and 7 of the drawings, the shim 25 is so disposed within the insert retaining pocket so that its projection 27 is located within the recess 23 adjacent the operative pair of cutting edges, 21a, 21b. The relative dimensions of the recess and projection are such that, as shown in the drawings, the upper planar surface 28 of the projection abuts the inner planar base 23a of the recess. An alternative possibility is for the respective tapering side walls of the recess and projection to abut. It will be understood that considerations of tolerances render it difficult, if not impossible, to ensure abutting by both the tapering surfaces and the planar surfaces of the recess and projection.

With the arrangement as shown, the insert lower surface 16b is firmly supported adjacent the operative corner thereof by the abutment of the projection 27 and the inner planar base 23a of the recess 23 and, on either side thereof, by the adjacent bearing surfaces 19 which bear on the planar surface 26 of the shim 25. In this way, it is ensured that the insert is effectively supported in the region directly adjacent the operative cutting edges, and this effectively prevents the generation of a bending moment which could result in the fracture of the insert.

Whilst in the specific embodiment just described the shim 25 is provided with a single projection 27 adjacent one of its corners, the shim could equally well be provided with additional projections opposite the remaining corners, provided that it is ensured that an unambiguous support is always effected between the projection and the recess opposite the operative cutting edges of the insert.

It will be understood that in all cases the insert is positioned on and supported by the shim by a three-point support system, of which the insert supporting projection constitutes one of these points, the other two being constituted by spaced-apart regions of the bearing surfaces 19.

Figure 8:
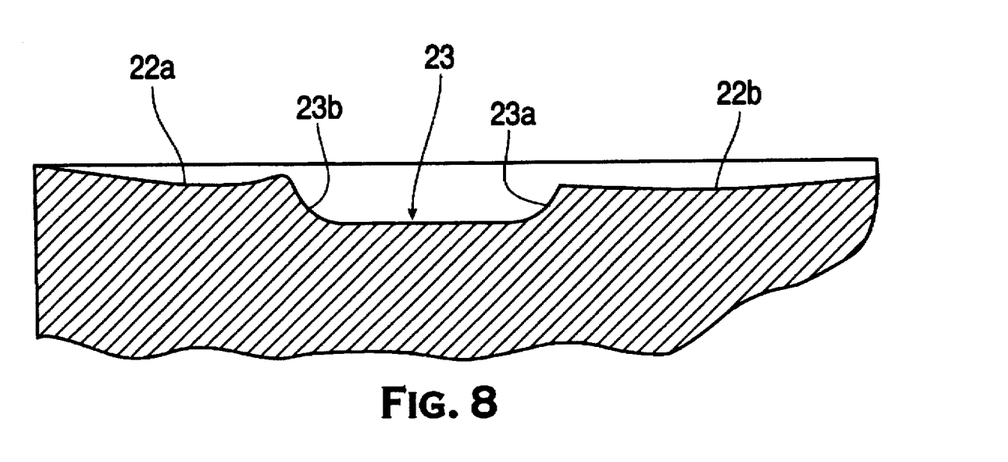
FIGS. 8, 9, 10 & 11 are respective cross-sectional views of the insert shown in FIG. 4, taken respectively along the lines VIII:VIII, IX:IX, X:X and XI:XI.
Figure 9:
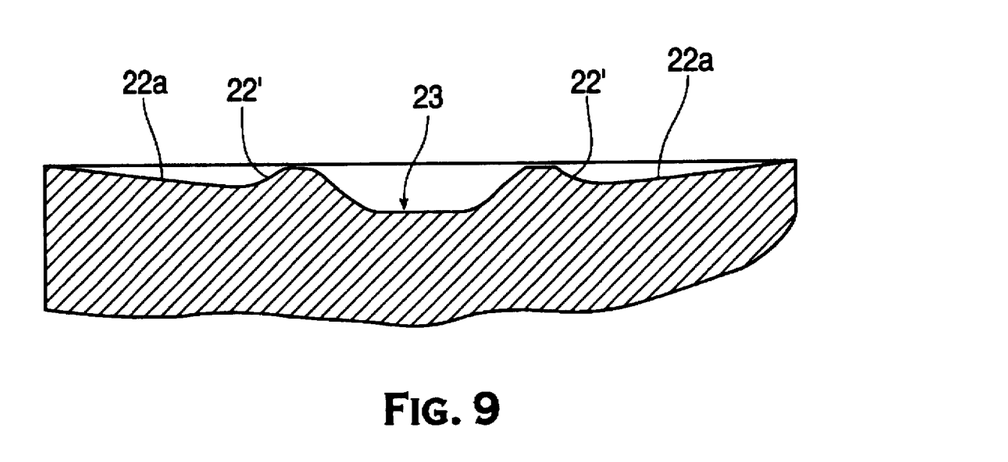

The location and dimensions of the recess 23 are so chosen as to ensure that during machining, the generated chips do not penetrate into the recess 23 and damage its supporting surfaces. Thus, as shown in FIGS. 8 and 9 of the drawings, the recess 23 is located immediately adjacent to and inwardly of the chip former groove 22, and in this way it is ensured that in operation the chips are deflected by the adjacent deflector wall 22' of the chip former groove 22, thereby preventing their entering the recesses.

I claim:

1. A cutting tool assembly comprising:
   (a) a tool holder formed with a cutting insert retaining pocket defined by a pocket base wall and a pocket side wall;
   (b) an indexable double-sided cutting insert having a substantially prismatic shape and comprising an upper and a lower insert surface having respective upper and lower rake surfaces and respective upper and lower bearing regions; side relief surfaces between said upper and lower insert surfaces; upper and lower cutting edges defined respectively between said side relief surfaces and upper and lower rake surfaces; insert corners defined between pairs of adjacent side relief surfaces and upper and lower cutting edges adjacent to said pairs, said insert corners being indexable into an operative position presenting thereby an adjacent pair of operative upper cutting edges and an adjacent pair of inoperative lower cutting edges; chip forming grooves respectively formed in said upper and lower rake surfaces adjacent said cutting edges; and insert support recesses formed respectively on said upper and lower rake surfaces, and being respectively disposed adjacent to said insert corners, each insert support recess being located inwardly of an adjacent deflection wall of said chip forming groove so as to ensure that generated chips are deflected from the insert support recess;

(c) a shim substantially corresponding in shape to said cutting insert, said shim formed with an upper shim surface and shim corners, said upper shim surface being provided with an insert supporting projection adjacent to one of said shim corners and adapted to fit contactingly into any of said insert support recesses; and (d) clamping means for retaining said cutting insert and said shim in said cutting insert retaining pocket, with said cutting insert being firmly clamped at a first side portion thereof remote from said pair of operative cutting edges against said pocket side wall, said upper shim surface in clamping contact with adjacent insert bearing regions, said insert supporting projection locally supporting the cutting insert at its operative insert corner, and said adjacent pair of inoperative lower cutting edges being spaced from said upper shim surface.

2. An assembly according to claim 1, wherein each of said insert support recesses is formed with a substantially planar recess base wall and tapered recess side walls.

3. An assembly according to claim 1, wherein each of said upper and lower bearing surfaces is constituted by a radially extending bearing surface disposed between adjacent insert corners.

4. An assembly according to claim 1, wherein said upper shim surface is provided with an insert supporting projection adjacent to each of said shim corners.

5. An assembly according to claim 1, wherein said shim is smaller than said cutting insert.

6. An indexable double-sided cutting insert having a substantially prismatic shape, said insert for use in a cutting tool assembly comprising a tool holder formed with a cutting insert retaining pocket having an insert supporting surface and an insert supporting projection formed thereon, said insert comprising:

an upper and a lower insert surface having respective upper and lower rake surfaces and upper and lower bearing surfaces;

side relief surfaces between said upper and lower insert surfaces;

upper and lower cutting edges defined respectively between said side relief surfaces and respective said upper and lower rake surfaces;

insert corners defined between pairs of adjacent side relief surfaces and upper and lower cutting edges adjacent to said pairs, said insert corners being indexable into an operative position presenting thereby an adjacent pair of operative upper cutting edges and an adjacent pair of inoperative lower cutting edges;

chip forming grooves respectively formed in said upper and lower rake surfaces adjacent said cutting edges; and insert support recesses formed respectively on said upper and lower rake surfaces, and being respectively disposed adjacent to said insert corners and adapted to receive contactingly said insert supporting projection, each recess being located inwardly of an adjacent deflection wall of said chip forming groove so as to ensure that generated chips are deflected from the recess.

7. A cutting insert according to claim 6, wherein each of said insert support recesses is formed with a substantially planar recess base wall and tapered recess side walls.

8. A cutting insert according to claim 6, wherein each of said upper and lower bearing surfaces is constituted by a radially extending bearing surface disposed between adjacent insert corners.

9. A cutting tool assembly comprising:

(a) an indexable double-sided cutting insert having a substantially prismatic shape, said insert comprising an upper and a lower insert surface having respective upper and lower rake surfaces and respective upper and lower bearing surfaces; side relief surfaces between said upper and lower insert surfaces; upper and lower cutting edges defined respectively between said side relief surfaces and respective said upper and lower rake surfaces; insert corners defined between pairs of adjacent side relief surfaces and said upper and lower cutting edges adjacent to said pairs, said insert corners being indexable into an operative position presenting thereby an adjacent pair of operative upper cutting edges and an adjacent pair of inoperative lower cutting edges; chip forming grooves respectively formed in said upper and lower rake surfaces adjacent said cutting edges; and insert support recesses formed respectively on said upper and lower rake surfaces and being relatively disposed adjacent to said insert corners, each insert support recess being located inwardly of an adjacent deflection wall of said chip forming groove so as to ensure that generated chips are deflected from the insert support recess;

(b) a tool holder formed with a cutting insert retaining pocket having an insert supporting surface, and an insert supporting projection formed on said insert supporting surface, said insert supporting projection adapted to fit contactingly into any one of said insert support recesses, and (c) clamping means for retaining said cutting insert in said cutting insert retaining pocket with said cutting insert being firmly clamped at a first side portion thereof remote from said pair of operative cutting edges against said pocket side wall, said insert supporting surface in clamping contact with the adjacent insert bearing surface, and with said insert supporting projection locally supporting the cutting insert at its operative insert corner, and said adjacent pair of inoperative lower cutting edges being spaced from said insert supporting surface.

10. A cutting tool assembly according to claim 9 further comprising a shim substantially corresponding in shape to said cutting insert, said shim adapted to be mounted, together with said cutting insert, in said insert retaining pocket, an upper surface of said shim constituting said insert supporting surface.

11. A cutting tool assembly comprising:

(a) a tool holder formed with a cutting insert retaining pocket defined by a pocket base wall and a pocket side wall;

(b) an indexable double-sided cutting insert having a substantially prismatic shape and comprising an upper and a lower insert surface having respective upper and lower rake surfaces and respective upper and lower bearing regions; side relief surfaces between said upper and lower insert surfaces; upper and lower cutting edges defined respectively between said side relief surfaces and upper and lower rake surfaces; insert corners defined between pairs of adjacent side relief surfaces and upper and lower cutting edges adjacent to said pairs, said insert corners being indexable into an operative position presenting thereby an adjacent pair of operative upper cutting edges and an adjacent pair of inoperative lower cutting edges; chip forming grooves respectively formed in said upper and lower rake surfaces adjacent said cutting edges; and insert support recesses formed respectively on said upper and lower rake surfaces, and being respectively disposed adjacent to said insert corners, each insert support recess being located inwardly of an adjacent deflection wall of said chip forming groove so as to ensure that generated chips are deflected from the insert support recess;

(c) a shim substantially corresponding in shape to said cutting insert, said shim formed with an upper shim surface and shim corners, said upper shim surface being provided with an insert supporting projection adjacent to one of said shim corners and adapted to fit contactingly into any of said insert support recesses; and (d) clamping means for retaining said cutting insert and said shim in said cutting insert retaining pocket so that the lower surface of the insert is firmly supported, at the operative cutting corner, by said insert supporting projection and, on either side thereof, by adjacent bearing regions which bear on said upper surface of the shim, said adjacent pair of inoperative lower cutting edges being spaced from said upper surface of the shim.

12. An assembly according to claim 10, wherein said bearing regions are radially extending regions disposed between adjacent insert corners.

13. A cutting tool assembly comprising:

(a) an indexable double-sided cutting insert having a substantially prismatic shape, said insert comprising an upper and a lower insert surface having respective upper and lower rake surfaces and respective upper and lower bearing surfaces; side relief surfaces between said upper and lower insert surfaces; upper and lower cutting edges defined respectively between said side relief surfaces and respective said upper and lower rake surfaces; insert corners defined between pairs of adjacent side relief surfaces and said upper and lower cutting edges adjacent to said pairs, said insert corners being indexable into an operative position presenting thereby an adjacent pair of operative upper cutting edges and an adjacent pair of inoperative lower cutting edges; chip forming grooves respectively formed in said upper and lower rake surfaces adjacent said cutting edges; and insert support recesses formed respectively on said upper and lower rake surfaces and being relatively disposed adjacent to said insert corners, each insert support recess being located inwardly of an adjacent deflection wall of said chip forming groove so as to ensure that generated chips are deflected from the insert support recess;

(b) a tool holder formed with a cutting insert retaining pocket having an insert supporting surface, and an insert supporting projection formed on said insert supporting surface, said insert supporting projection adapted to fit contactingly into any one of said insert support recess; and (c) clamping means for retaining said cutting insert in said cutting insert retaining pocket so that the lower surface of the insert is firmly supported, at the operative corner of the cutting insert, by said insert supporting projection and, on either side thereof, by adjacent regions of the bearing surface which bear on said insert supporting surface, said adjacent pair of inoperative lower cutting edges being spaced from said upper surface of the insert supporting surface.

* * * * *

UNITED STATES PATENT AND TRADEMARK OFFICE
CERTIFICATE OF CORRECTION

PATENT NO. : 5,702,210

DATED : December 30, 1997

INVENTOR : Gideon Boianjiu

It is certified that error appears in the above-identified patent and that said Letters Patent is hereby corrected as shown below:

TITLE PAGE: [63] Related U.S. Application Data line 2, change "PCT/EP93/09713" to --PCT/EP93/03713--.

Column 1, line 6: change "Jul. 21, 1997," to --Jul. 21, 1994,--.

Signed and Sealed this

Twenty-fourth Day of March, 1998

Attest:

BRUCE LEHMAN

*Attesting Officer*      *Commissioner of Patents and Trademarks*